(12) United States Patent
Riocreux et al.

(10) Patent No.: US 7,664,901 B2
(45) Date of Patent: Feb. 16, 2010

(54) DATA PROCESSING APPARATUS AND METHOD FOR ARBITRATING ACCESS TO A SHARED RESOURCE

(75) Inventors: Peter Andrew Riocreux, Manchester (GB); Alistair Crone Bruce, Stockport (GB); Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 282 days.

(21) Appl. No.: 11/727,647

(22) Filed: Mar. 27, 2007

(65) Prior Publication Data
US 2008/0244133 A1    Oct. 2, 2008

(51) Int. Cl.
*G06F 13/38* (2006.01)
(52) U.S. Cl. .................. 710/244; 710/240; 710/241; 710/242; 710/243
(58) Field of Classification Search .......... 710/240–244
See application file for complete search history.

(56) References Cited

U.S. PATENT DOCUMENTS 5,832,278 A * 11/1998 Pham .......................... 710/243
2004/0210695 A1 * 10/2004 Weber et al. ................. 710/240

* cited by examiner

*Primary Examiner*—Khanh Dang
*Assistant Examiner*—Kim T Huynh
(74) *Attorney, Agent, or Firm*—Nixon & Vanderhye P.C.

(57) ABSTRACT

A data processing apparatus and method are providing for arbitrating access to a shared resource. The data processing apparatus has a plurality of logic elements sharing access to the shared resource, and arbitration circuitry which is responsive to requests by one or more of the logic elements for access to the shared resource to perform a priority determination operation to select one of the requests as a winning request. The arbitration circuitry applies an arbitration policy to associate priorities with each logic element, the arbitration policy comprising multiple priority groups, each priority group having a different priority and containing at least one of the logic elements. Within each priority group, the arbitration circuitry applies a priority ordering operation to attribute relative priorities to the logic elements within that priority group. Responsive to a predetermined event, the arbitration circuitry re-applies the priority ordering operation within at least one priority group prior to a subsequent performance of the priority determination operation. Such an approach has been found to provide a particularly flexible mechanism for performing arbitration, allowing a wide variety of different arbitration schemes to be implemented using the same arbitration hardware.

16 Claims, 5 Drawing Sheets

DATA PROCESSING APPARATUS AND METHOD FOR ARBITRATING ACCESS TO A SHARED RESOURCE

TECHNICAL FIELD

The present invention relates to a data processing apparatus and method for arbitrating access to a shared resource.

BACKGROUND

Within a data processing apparatus, it is known to provide one or more resources which are shared amongst a plurality of logic elements of the data processing apparatus. For example, the plurality of logic elements may take the form of a plurality of master logic units, and the shared resource may take the form of a slave logic unit with respect to which the various master logic units can initiate transactions. Each transaction typically consists of an address transfer from a master logic unit to a slave logic unit, and one or more data transfers between the master logic unit and the slave logic unit. For a write transaction, these data transfers will pass from the master logic unit to the slave logic unit (in some implementations there will additionally be a write response transfer from the slave logic unit to the master logic unit), whilst for a read transaction these data transfers will pass from the slave logic unit to the master logic unit.

To enable each transaction to take place, a communication path needs to be established between the master logic unit initiating the transaction, and the slave logic unit to which the transaction is directed. If the slave logic unit is shared amongst a plurality of master logic units, then this can cause contention amongst the various master logic units for access to the shared slave logic unit, and this contention can occur at a variety of points within the data processing apparatus.

For example, dependent on the mechanism provided for establishing the communication paths, it may be possible to provide separate dedicated communication paths for each master logic unit. However, since the slave logic unit will typically only be able to handle one transaction at a time, this leads to contention at the input to the slave logic unit itself, and typically it is then necessary to provide arbitration circuitry to arbitrate between multiple simultaneous access requests issued by different master logic units and seeking to access the same shared slave logic unit.

More typically, the mechanism used to establish the communication paths between master logic units and slave logic units is also shared amongst the various master and slave logic units. Accordingly there will typically be points along the communication paths between a master logic unit and a slave logic unit which involve use of a shared physical connection medium, and accordingly arbitration is typically required at such points along the communication paths.

For example, a data processing apparatus may provide interconnect circuitry for coupling the various master logic units and slave logic units, with the interconnect circuitry providing a plurality of connection paths over which such communication paths can be established. Often, certain of the connection paths are shared between multiple logic units, and accordingly arbitration circuitry is provided to arbitrate access to such connection paths. In such instances, it can be seen that the connection paths themselves form a shared resource.

Hence, it will be appreciated that within a typical data processing apparatus, there will be a variety of shared resources and wherever multiple logic elements are contending for access to that shared resource, arbitration circuitry is typically provided to arbitrate amongst those logic elements so as to decide at any point in time which logic element should have access to that shared resource.

Typically, the arbitration circuitry will be configured to apply a particular arbitration policy to decide which logic element to grant access to the shared resource at any particular point in time. For example, a known arbitration scheme may use an algorithm that employs a fixed priority technique, whereby particular priority levels are associated with particular logic elements, and then when multiple logic elements are seeking to access a shared resource at the same time, the arbitration circuitry grants access to the logic element having the highest priority. An alternative known arbitration policy applies a round robin (fair share) technique, which may for example be appropriate when all of the various logic elements that may access the shared resource are considered to have equal priority, and the aim is to seek to provide each logic element with the same level of access to the shared resource.

Whilst certain known arbitration policies are more suited to certain situations than others, typically the arbitration circuitry within the data processing apparatus will be configured to employ one particular arbitration policy which leads to a lack of flexibility in the design. Accordingly, it would be desirable to provide a more flexible technique for performing arbitration within a data processing apparatus.

SUMMARY

Viewed from a first aspect, the present invention provides a data processing apparatus comprising: a shared resource; a plurality of logic elements sharing access to the shared resource; arbitration circuitry, responsive to requests by one or more of said logic elements for access to the shared resource, to perform a priority determination operation to select one of said requests as a winning request; the arbitration circuitry applying an arbitration policy to associate priorities with each logic element, the arbitration policy comprising multiple priority groups, each priority group having a different priority and containing at least one of said logic elements, within each priority group the arbitration circuitry applying a priority ordering operation to attribute relative priorities to the logic elements within that priority group; and the arbitration circuitry being responsive to a predetermined event to re-apply the priority ordering operation within at least one priority group prior to a subsequent performance of the priority determination operation.

The arbitration circuitry is arranged to apply an arbitration policy that comprises multiple priority groups, with each group having a different priority. Each of the logic elements is allocated to one of those priority groups such that each priority group contains at least one of the logic elements. Within each priority group the arbitration circuitry then applies a priority ordering operation to attribute relative priorities to the logic elements within that priority group. Responsive to a predetermined event, the arbitration circuitry then re-applies the priority ordering operation within at least one priority group prior to a subsequent performance of a priority determination operation used to select a winning request from the requests currently seeking access to the shared resource.

In performing the priority determination operation, the arbitration circuitry selects as the winning request the request having the highest priority. From the above-described arbitration policy, it will be appreciated that a particular request's priority will be dependent on which priority group the logic element issuing that request is associated with, and also will depend on the relative priorities attributed to the logic elements within that particular priority group. Since the priority ordering operation that determines the relative priorities within a priority group is re-applied upon occurrence of a predetermined event, the relative priorities of the logic elements within a particular priority group will vary over time (assuming that priority group contains more than one logic element).

Such an approach provides a great deal of flexibility as to the type of arbitration scheme employed by the arbitration circuitry. This flexibility is possible due to the two tier approach to prioritisation, where different priorities are associated with each priority group, and then relative priorities are attributed to the logic elements within any particular priority group, with those relative priorities being recalculated following predetermined events. In one embodiment, the predetermined event is the occurrence of the priority determination operation itself, and accordingly in such embodiments each time the arbitration circuitry selects a winning request, the priority ordering operation is re-applied, which dependent on the number of logic elements within the priority group, and the form of the priority ordering operation applied, may cause the relative priorities to change on each iteration of the priority determination operation. However, the priorities of the priority groups themselves are not changed by re-application of the priority ordering operation.

As a result, through use of the multiple priority groups, the arbitration circuitry can readily implement a variety of different arbitration schemes. For example, if each priority group is arranged to contain a single logic element, then the re-applying of the priority ordering operation will have no effect, and a fixed priority scheme will be implemented by the arbitration circuitry. At the other end of the scale, if a large number of logic elements are contained within the same priority group, then the arbitration scheme adopted with respect to requests from those logic elements may implement a round robin style or least recently granted style priority scheme, dependent on the form of the priority ordering operation performed to attribute the relative priorities.

Accordingly, the actual arbitration scheme applied by the arbitration circuitry can be varied significantly through appropriate selection of priority groups, and the logic elements associated with each priority group.

As mentioned previously, the predetermined event which causes the priority ordering operation to be re-applied can take a variety of forms. However, in one embodiment, the predetermined event is a current performance of the priority determination operation, and the arbitration circuitry re-applies the priority ordering operation in respect of at least the priority group containing the logic element associated with the winning request selected by that current performance of the priority determination operation. In one particular embodiment, the priority ordering operation is re-applied only in respect of the priority group containing the logic element associated with the winning request.

The priority groups, and logic elements contained within each group, can be identified in a variety of ways. However, in one embodiment configuration circuitry is provided for storing an indication of the priority groups and which priority group each of the logic elements is contained within. In one embodiment, the configuration circuitry is at least partially programmable, the arbitration circuitry being responsive to reprogramming of the configuration circuitry to update the arbitration policy. In one embodiment, the entirety of the configuration circuitry's content is programmable, and hence the priority groups themselves, and their logic element membership, can be altered. However, in an alternative embodiment, only part of the configuration circuitry's contents may be programmable whilst another part's content is fixed. Hence, the priority group in which some logic elements belong may be fixed, whilst the priority group in which other logic elements belong is programmable.

By reprogramming of the configuration circuitry, the arbitration policy applied by the arbitration circuitry can be updated to identify the revised priority groups and/or revised logic element membership of each priority group. As discussed earlier, such changes in the priority groups and/or their membership can significantly alter the arbitration scheme implemented by the arbitration circuitry when applying the revised arbitration policy, without any changes to the hardware of the arbitration circuitry. Hence, such embodiments provide programmable hardware arbitration circuitry, where the actual arbitration policy/scheme that is implemented can be dynamically changed through reprogramming of the configuration circuitry.

The configuration circuitry can be arranged in a variety of ways. For example, the configuration circuitry may take the form of a register, or series of registers, in which the priority groups and logic element membership of each priority group is identified. When such information is changed, this may be implemented with respect to the configuration circuitry by re-writing the contents of the registers to identify the revised priority groups and/or logic element membership.

However, in an alternative embodiment, the configuration circuitry may be arranged to be responsive to a signal specifying a new priority for one of the logic elements, and in response to that signal re-determine the priority groups and which priority group each of the logic elements is contained within. Hence, in such embodiments, the configuration circuitry employs some form of automatic sorting mechanism to re-sort the priority groups and the priority group membership dependent on the new priority given to one of the logic elements. Such a sort mechanism may be implemented either in hardware or software-controlled computer. As an example of the sorting required, as a result of the new priority given to one of the logic elements, that logic element may need to move from one priority group to another already-existing priority group. Alternatively, the new priority given to the logic element may require the formation of a new priority group in which that logic element then becomes the only member.

The arbitration circuitry can be arranged in a variety of ways. However, in one embodiment, the arbitration circuitry comprises: a plurality of interconnected arbitration elements for collectively maintaining a priority ordered list of said logic elements for reference when performing the priority determination operation, each arbitration element for storing a logic element identifier identifying one of said logic elements, and the plurality of interconnected arbitration elements encoding which priority group each logic element is contained within; responsive to said predetermined event, each arbitration element performing an update operation in order to determine whether to change the logic element identifier stored therein, whereby the priority ordering operation is re-applied within at least one priority group prior to a subsequent performance of the priority determination operation.

Such an approach provides a very scalable solution, since it is merely necessary to provide a separate arbitration element for each logic element that shares access to the shared resource being arbitrated, and each arbitration element performs its own update operation upon occurrence of the predetermined event. The collective effect of each arbitration element performing its own update operation is that the priority ordering operation is re-applied within at least one priority group.

In one embodiment, the predetermined event causing the re-application of the priority ordering operation is a current performance of priority determination operation, and each arbitration element performs the update operation having regard to an indication of the logic element associated with the winning request. In particular, in such embodiments, the arbitration elements take different actions dependent on whether the logic element identifier currently stored therein matches with the indication of the logic element associated with the winning request, or not.

There are a number of ways in which the plurality of interconnected arbitration elements can encode which priority group each logic element is contained within. However, in one embodiment, a bottom of group indication is stored in each arbitration element storing a logic element identifier for a logic element having the lowest relative priority in its priority group. This bottom of group indication is used when performing the update operation within each arbitration element, and in particular in one embodiment controls whether or not a change signal is propagated to an adjacent interconnected arbitration element to influence the actions taken during the update operation performed in that adjacent arbitration element.

There are a number of ways in which each arbitration element can be advised of the occurrence of the predetermined event. However, in one embodiment, occurrence of the predetermined event is indicated by a control signal issued to each of the arbitration elements to initiate the update operation within each arbitration element. In one particular embodiment where the predetermined event is the performance of the priority determination operation, a valid signal issued with each valid winning request output by the arbitration circuitry is used to derive the control signal issued to each arbitration element.

The priority ordering operation applied within each priority group to attribute relative priorities to the logic elements within that priority group can take a variety of forms. However, in one embodiment where the priority ordering operation is re-applied following each performance of the priority determination operation, the priority ordering operation may be arranged to implement a least recently granted selection criteria within the at least one priority group to which that priority ordering operation is applied. In such embodiments, the logic element issuing the winning request is relegated to the bottom of its priority group (i.e. is given the lowest relative priority amongst the logic elements within that group).

As an alternative scheme that could be implemented, the priority ordering operation could implement a round robin selection criteria within the at least one priority group. Each time the priority determination operation is performed, then the logic element having the highest relative priority is relegated to the bottom of the priority group, irrespective of whether it was asserting an access request at that time or not. This may for example be appropriate within priority groups where the logic elements within that group are expected to be issuing requests for a significant proportion of the time.

As mentioned earlier, dependent on how the configuration circuitry is programmed, a wide variety of different arbitration schemes can be implemented. At one end of the scale, the configuration circuitry may be programmed to identify one logic element within each priority group, whereby the arbitration policy implements a fixed priority arbitration scheme. At the other end of the scale, the configuration circuitry may be programmed to identify one priority group within which all of the logic elements are contained, whereby the arbitration policy implements an arbitration scheme dictated solely by the priority ordering operation.

Viewed from a second aspect, the present invention provides a method of arbitrating access to a shared resource in a data processing apparatus having a plurality of logic elements sharing access to the shared resource, the method comprising the steps of: responsive to requests by one or more of said logic elements for access to the shared resource, performing within arbitration circuitry a priority determination operation to select one of said requests as a winning request; the arbitration circuitry: (i) applying an arbitration policy to associate priorities with each logic element, the arbitration policy comprising multiple priority groups, each priority group having a different priority and containing at least one of said logic elements; (ii) within each priority group applying a priority ordering operation to attribute relative priorities to the logic elements within that priority group; and (iii) responsive to a predetermined event, re-applying the priority ordering operation within at least one priority group prior to a subsequent performance of the priority determination operation.

Viewed from a third aspect, the present invention provides a data processing apparatus comprising: shared resource means; a plurality of logic element means for sharing access to the shared resource means; arbitration means, responsive to requests by one or more of said logic element means for access to the shared resource means, for performing a priority determination operation to select one of said requests as a winning request; the arbitration means for applying an arbitration policy to associate priorities with each logic element means, the arbitration policy comprising multiple priority groups, each priority group having a different priority and containing at least one of said logic element means, within each priority group the arbitration means for applying a priority ordering operation to attribute relative priorities to the logic element means within that priority group; and the arbitration means responsive to a predetermined event for re-applying the priority ordering operation within at least one priority group prior to a subsequent performance of the priority determination operation.

DETAILED DESCRIPTION

The arbitration circuitry of non-limiting example embodiments can be used at any location within a data processing apparatus where a plurality of logic elements are contending for access to a shared resource, for example a shared slave device, a shared connection path, etc. By way of illustration of one particular embodiment, a data processing apparatus will be considered having a plurality of master logic units coupled via interconnect circuitry with a plurality of slave logic units.

Interconnect circuitry typically provides a plurality of connection paths for coupling the various master logic units and slave logic units, and the way in which the various transfers of each transaction are routed via those connection paths will be dependent on the bus protocol employed within the interconnect circuitry.

One known type of bus protocol is the non-split transaction protocol, where there is a fixed timing relationship between the address transfer of a transaction and the subsequent one or more data transfers of that transaction. However, for the purposes of illustration, it will be assumed that the interconnect circuitry of the data processing apparatus employs a split transaction protocol in which separate address channels and data channels are provided, and the timing of data transfers is decoupled with respect to the timing of address transfers of a particular transaction. In one particular embodiment, the interconnect circuitry operates in accordance with the AXI (Advanced eXtensible Interface) protocol developed by ARM Limited, Cambridge, United Kingdom, and the connection paths of the interconnect circuitry provide five channels, namely a read address channel, a write address channel, a read data channel, a write data channel and a write response channel.

Figure 1:
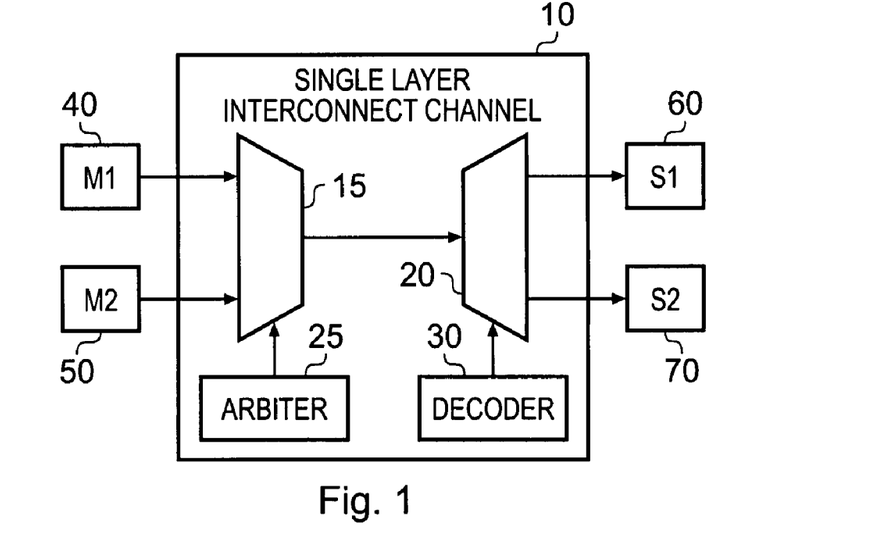
FIG. 1 is a block diagram illustrating a channel of a single layer interconnect structure.

In one embodiment, the interconnect circuitry has a single layer interconnect structure. FIG. 1 is a block diagram illustrating schematically the read address channel of such a single layer interconnect. In this example, two master logic units 40, 50 and two slave logic units 60, 70 are coupled to the channel 10 of the single layer interconnect. Within the channel 10, an arbiter 25 is used to control a multiplexer 15 so as to arbitrate between multiple read address transfers issued by the master logic units 40, 50. Similarly, a decoder 30 is provided for controlling the de-multiplexer 20 so as to route any particular read address transfer to the appropriate target slave logic unit 60, 70.

The write address channel and the write data channel are constructed in a similar way to the read address channel illustrated in FIG. 1. The read data channel and write response channel are also constructed similarly, but in these two instances the position of the master logic units 40, 50 and slave logic units 60, 70 are reversed, since for these two channels the transfers occur from the slave logic units to the master logic units, and hence the arbitration is performed between slave logic units rather than master logic units.

Figure 2:
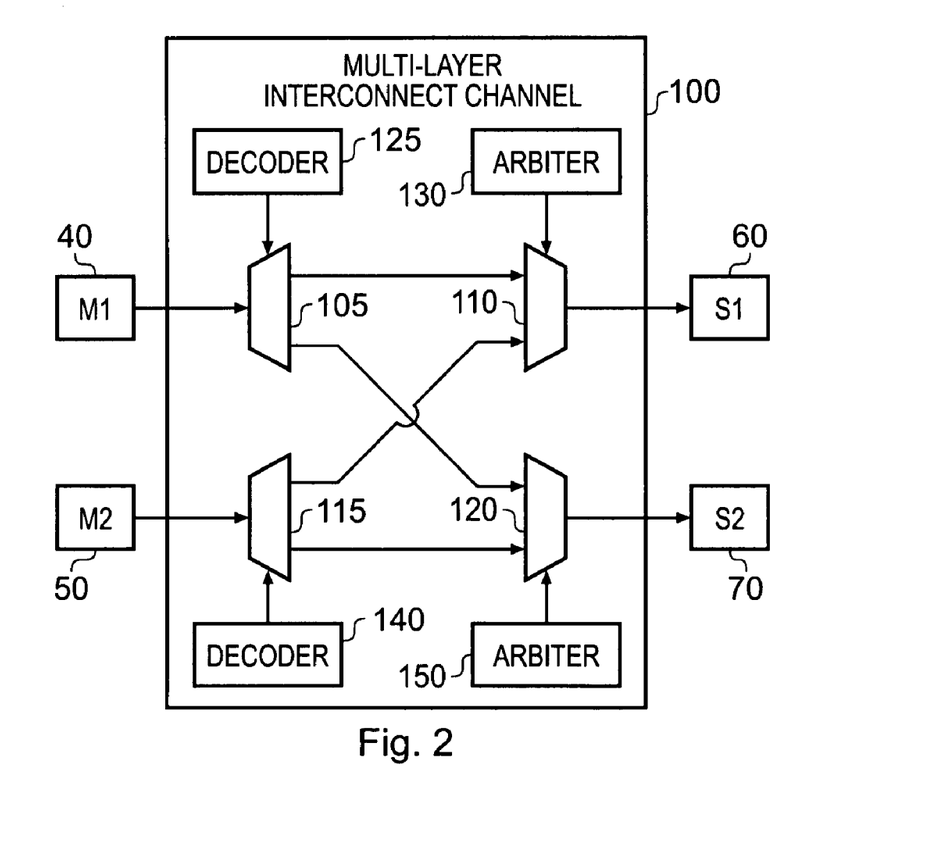
FIG. 2 is a block diagram illustrating a channel of a multi-layer interconnect structure.

In an alternative embodiment, the interconnect circuitry has a multi-layer interconnect structure. FIG. 2 schematically illustrates the components provided within a read address channel of such a multi-layer interconnect structure in accordance with one embodiment. Again, two master logic units 40, 50 and two slave logic units 60, 70 are shown connected to the read address channel 100. Decoders 125, 140 are provided in association with each master logic unit 40, 50, for controlling respective de-multiplexers 105, 115 so as to control the routing of the read address transfers through the channel 100 dependent on the target slave logic unit. Further, arbiters 130, 150 are provided in association with each slave logic unit 60, 70 for controlling respective multiplexers 110, 120 so as to arbitrate between multiple read address transfers destined for a particular slave logic unit. As with the FIG. 1 example, the write address channel and write data channel for a multi-layer interconnect structure will be constructed in a similar manner to that shown for the read address channel 100 of FIG. 2. Further, the read data channel and write response channel will also be constructed similarly but with the positions of the master logic units 40, 50 and slave logic units 60, 70 reversed, and hence the arbiters will be provided in association with each master logic unit rather than each slave logic unit.

It will be appreciated that in a typical data processing apparatus, there will often be more than two master logic units and more than two slave logic units, and accordingly there will be a corresponding proliferation of paths and associated logic within each of the channels. Accordingly the diagrams of FIGS. 1 and 2 should be treated as schematic illustrations rather than diagrams of the actual paths provided in any particular embodiment.

From the above discussions, it will be appreciated that in such embodiments there are likely to be a significant number of locations within each of the channels where arbiters are required to arbitrate between multiple logic units seeking to access a shared resource. Such arbiters may be directly arbitrating access to a shared logic unit, such as the arbiters 130, 150 which arbitrate access to the shared slave devices 60, 70, respectively, whilst other arbiters may be arbitrating between multiple logic units seeking to access a shared connection path, such as the arbiter 25 arbitrating between master logic units 40, 50 seeking to access the shared connection path through the single layer interconnect channel 10.

Figure 3:
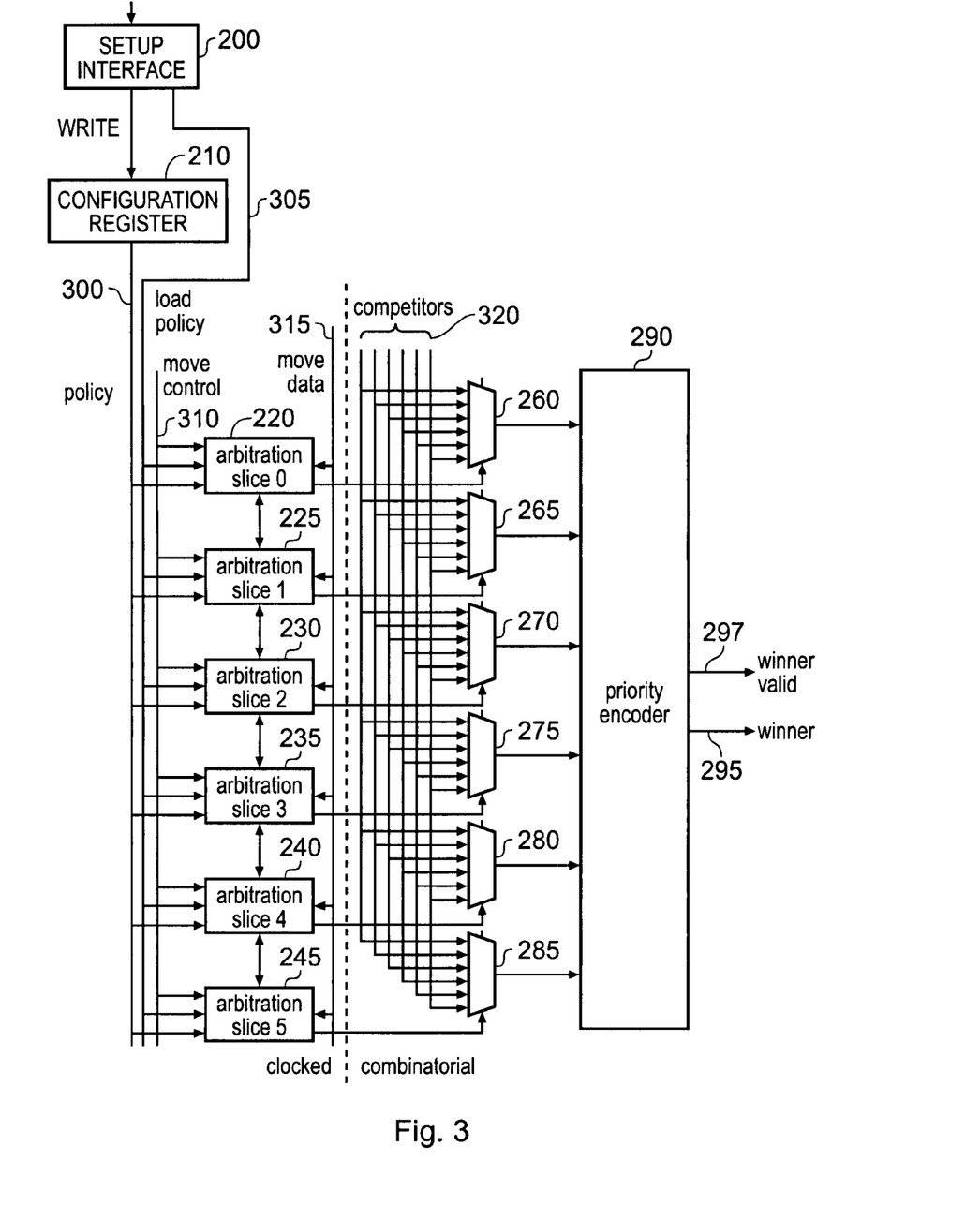
FIG. 3 is a block diagram illustrating components provided within an arbiter in accordance with one example embodiment.

In accordance with one embodiment, each such arbiter may be constructed as shown in FIG. 3 to provide significant flexibility as to the choice of arbitration scheme implemented by that arbiter.

For the arbiter of FIG. 3, it is assumed that there are six logic elements contending for access to the shared resource, and requests from those six competing logic units are received over paths 320 and routed as inputs to each of the six multiplexers 260, 265, 270, 275, 280, 285. Which of the various inputs received by each such multiplexer is output will depend on a control signal received by an associated arbitration slice 220, 225, 230, 235, 240, 245, respectively.

Each arbitration slice stores a logic element identifier for one of the six logic elements and outputs that logic element identifier as a control signal to the associated multiplexer in order to cause that multiplexer to output to the priority encoder 290 the value of the access request signal received from that identified logic element. The six interconnected arbitration slices 220, 225, 230, 235, 240, 245 hence collectively maintain a priority ordered list with the highest priority logic element being identified in arbitration slice zero 220 and the lowest priority logic element being identified in arbitration slice five 245.

Hence, if the logic element identified by arbitration slice zero 220 is asserting an access request, that asserted access request will be output by the multiplexer 260 to the priority encoder 290, and will be selected as the winning access request for outputting over path 295, irrespective of the signals output from the other multiplexers 265, 270, 275, 280, 285. However, if the logic element identified by arbitration slice zero 220 is not asserting an access request, but the logic element identified by arbitration slice one 225 is, then the priority encoder 290 will select as the winning access request the access request notified from multiplexer 265. Hence, the relative priorities between the outputs of the various multiplexers 260, 265, 270, 275, 280, 285 are fixed, and the priority encoder 290 can be hard-wired to select at any particular point the highest priority asserted access request that it receives from the various multiplexers. As a result, by way of illustration, if the logic element identified in arbitration slice five 245 is currently asserting an access request, then that asserted access request will be issued to the priority encoder 290 from the multiplexer 285, but will only be chosen as the winning access request if none of the other logic elements are asserting access requests at that time.

The flexibility resulting from the use of the arbiter of FIG. 3 stems from the manner in which the priority ordered list is initially constructed and the manner in which that priority ordered list is altered upon receipt of each move control signal. In particular, the arbitration policy applied by the arbiter of FIG. 3 comprises multiple priority groups, each priority group having a different priority and containing at least one of the logic elements. Within each priority group a priority ordering operation is applied via update operations performed within each arbitration slice 220, 225, 230, 235, 240, 245 to attribute relative priorities to the logic elements within each priority group. Hence, considering the example of FIG. 3 where there are six logic elements contending for access to a shared resource, there can be anywhere between one and six priority groups, and where any particular priority group contains multiple logic elements a priority ordering operation will be used to attribute relative priorities to the logic elements within that priority group.

An initial indication of the priority groups and which priority group each of the logic elements is contained within is stored within the configuration register 210, which can be written to via a setup interface 200. In one embodiment, a separate configuration register may be provided in association with each arbiter in the apparatus. However, alternatively, a single configuration register may be provided for all of the arbiters, or for at least a subset of all of the arbiters in the apparatus.

Figure 4:
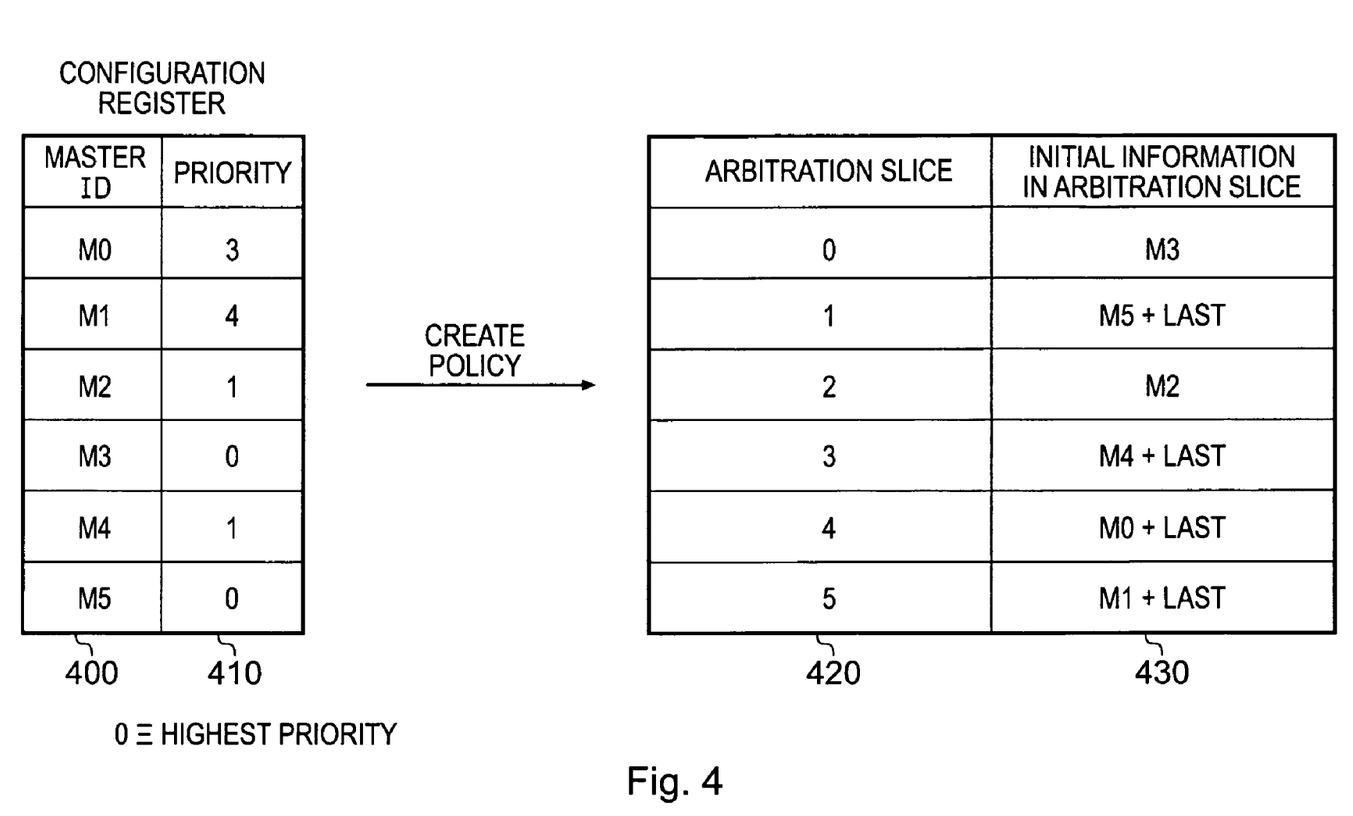
FIG. 4 schematically illustrates the creation of an arbitration policy from the contents of the configuration register of FIG. 3 in accordance with one example embodiment.

Whenever the contents of the configuration register 210 are altered, a load policy signal is issued over path 305 to each of the arbitration slices 220, 225, 230, 235, 240, 245, to cause them to load an updated arbitration policy over path 300. An example of how the arbitration policy is created from the contents of the configuration register 210 is illustrated schematically in FIG. 4. As shown in FIG. 4, in this purely illustrative example, the configuration register 210 has multiple entries, one for each logic element M0 through M5 and each entry has a field 400 identifying the logic element, and an associated field 410 identifying the priority given to that logic element. In this example, the six logic elements are master logic units, and master logic units 3 and 5 are given the highest priority (priority zero), master logic units 2 and 4 are given the next highest priority, master logic unit 0 is given a lower priority, and master logic unit 1 is given an even lower priority than master logic unit 0.

When the load policy signal is issued over path 305 (in one embodiment this is issued by the setup interface 200 once the configuration register has been written to via the setup interface, but in an alternative embodiment the load policy signal could be issued by some control circuitry associated with the configuration register 210 itself), control circuitry provided in association with the configuration register 210 creates from the contents of the configuration register the arbitration policy, the arbitration policy in particular identifying what information should be stored in each arbitration slice. In this example, if two logic units have been given the same priority, the lower numbered logic unit is initially considered to have a higher relative priority, but this choice is clearly arbitrary, and alternatively the higher numbered logic unit could be viewed as having the higher relative priority.

Thus, in this example, arbitration slice zero 220 stores as its logic element identifier an identifier for master logic unit three. Arbitration slice one 225 then stores an identifier for master logic unit five. Similarly, arbitration slice two 230 stores an identifier for master logic unit two, arbitration slice three 235 stores an identifier for master logic unit four, arbitration slice four 240 stores an identifier for master logic unit zero, and arbitration slice five 245 stores an identifier for master logic unit one.

Additionally, so that the information about the priority groups is not lost, the priority group information is encoded within the information maintained by the interconnected arbitration slices. In particular, in one embodiment, any arbitration slice that stores an identifier for the last logic element in a particular priority group also stores a bottom of group identifier (also referred to in FIG. 4 as a "last" identifier). Hence, arbitration slice one 225 contains a last identifier, indicating that it contains the last logic element for the first priority group (the first priority group containing all those logic elements having a priority level of zero), and similarly the arbitration slices three, four, five 235, 240, 245 also contain last identifiers. Hence, in this purely illustrative example, it can be seen that there are four priority groups, two of which contain two logic elements, and two of which contain only a single logic element.

The configuration register 220 may be arranged so that whenever any of the priorities are changed, the entire contents of the configuration register 210 are re-written. However alternatively, a hardware or software-controlled computer sort mechanism can be employed in association with the configuration register so that when a new priority for one of the logic elements is identified via the setup interface 200, a re-determination of the priority groups and which priority group each of the logic elements is contained within, is performed in order to update the contents of the configuration register 210.

Following the loading of values into the arbitration slices via the load policy signal on path 305, and the policy data provided over path 300, the arbiter can then perform a priority determination operation to select a winning request from multiple requests received over path 320. Upon occurrence of predetermined events, a move control signal is issued to each arbitration slice over path 310, in association with move data input over path 315, to cause each arbitration slice to perform an update operation as will be discussed in more detail later with reference to FIG. 6. This can cause the logic element identifier stored in two or more of the arbitration slices to be changed, which in turn will affect the outcome of a subsequent priority determination operation performed by the arbiter.

The move data provided on path 315 can in one embodiment be arranged in a similar way to the original policy data output over path 300, and hence will identify the entry to be stored in each arbitration slice. However, in an alternative embodiment, the move data identifies a single logic element which is to trigger a re-ordering of the logic element identifiers within the priority group containing that identified logic element, so as to alter the relative priorities of the logic elements within that priority group.

In one particular embodiment, the priority encoder 290 will in every clock cycle produce an output signal on path 295, but only when a priority determination operation is actually being performed will the output signal on path 295 be qualified with a winner valid signal on path 297, indicating that the data on path 295 identifying the winning access request is valid and represents the outcome of the priority determination operation. In one such embodiment, the winner valid signal on path 295 is used to generate the move control signal over path 310, and the move data on path 315 identifies the winning access request output on path 295 in association with that winner valid signal. Hence, in such embodiments, each arbitration slice is caused to perform its update operation every time the arbiter performs a priority determination operation, and this causes a re-calculation of the relative priorities of the logic elements within the priority group containing the logic element associated with the winning request.

In one particular embodiment, the update operation performed within each arbitration slice implements a priority ordering operation that provides a least recently granted prioritisation within the group containing the logic element associated with the winning access request. This is illustrated schematically by way of example with reference to FIG. 5.

Figure 5:
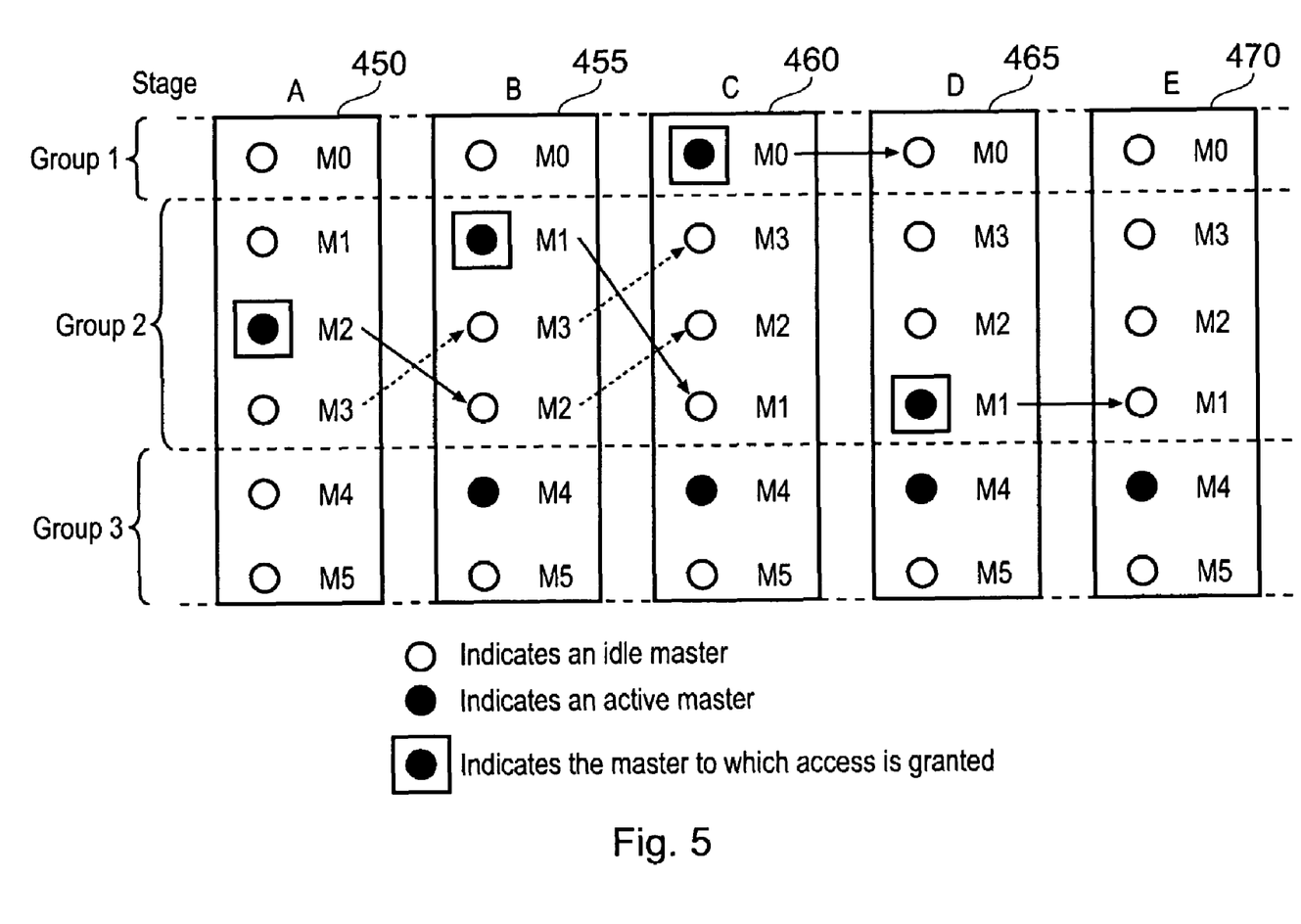
FIG. 5 schematically illustrates the operation of the arbiter of FIG. 3 in one example embodiment for a particular sequence of access requests.

As shown in FIG. 5 by way of illustration, it is assumed that there are three priority groups, the first priority group (group one) containing a single logic element and having the highest priority, the next highest priority group (group two) having three logic elements contained therein, and the final, lowest, priority group (group three) containing two logic elements.

On a first iteration of the priority determination operation performed by the arbiter (identified as stage A in FIG. 5), only master logic unit two is asserting an access request, and accordingly only multiplexer 270 of FIG. 3 will output an active access request and hence the priority encoder 290 will select as the winning access request the access request issued by the master logic unit two. This will cause a move control signal to be issued to each of the arbitration slices, along with move data identifying master logic unit two as the winning access request. As a result of the update operation then initiated in each of the arbitration slices, arbitration slices one, two and three 225, 230, 235 will perform a re-ordering of the content stored within them, such that the identifier for master logic unit two is relegated to the bottom of the group, and in this case causes the logic element formerly at the bottom of the group to move up one place. Hence, following this re-ordering, arbitration slice one 225 will continue to identify master logic unit one, arbitration slice two 230 will now identify master logic unit three, and arbitration slice three will now identify master logic unit two.

On the next iteration 455 of the priority determination operation (identified as stage B in FIG. 5), both master logic units one and four have active access requests, and accordingly master logic unit one will be granted access via the priority encoder 290 since it has the highest priority. Again, this will cause a re-ordering operation to be performed as a result of which the identifier for master logic unit one will be relegated to the bottom of the group and will now be stored in arbitration slice three 235. As a result, the other two logic elements in the group will have their relative priorities increased by one position, arbitration slice one 225 now identifying master logic unit three and arbitration slice two 230 now identifying master logic unit two.

On a next iteration 460 of the priority determination operation (identified as stage C in FIG. 5), master logic units zero and four have active access requests, and accordingly master logic unit zero is asserted as the winning access request by the priority encoder 290. The move control signal and move data signals will again be issued over path 310, 315, but since the winning request in this case is associated with a logic unit that is the only member of a particular priority group (in this instance priority group one), the update operations performed by the various arbitration slices cause no re-ordering to take place.

On a next iteration of the priority determination operation (identified as stage D in FIG. 5), master logic units one and four assert active access requests, and accordingly the access request from master logic unit one is selected as the winning access request. Again the move control and the move data signals are issued, but in this instance because the winning access request is already at the bottom of its group, no re-ordering takes place.

On the final iteration of the priority determination operation 470 (identified as stage E in FIG. 5), the only master asserting an access request is master logic unit four, and accordingly that access request is chosen as the winning access request by the priority encoder 290. Although not shown in FIG. 5, this will cause a re-ordering operation to be performed with respect to the arbitration slices forming group 3, as a result of which the contents of arbitration slices four and five 240, 245 will be swapped.

Figure 6:
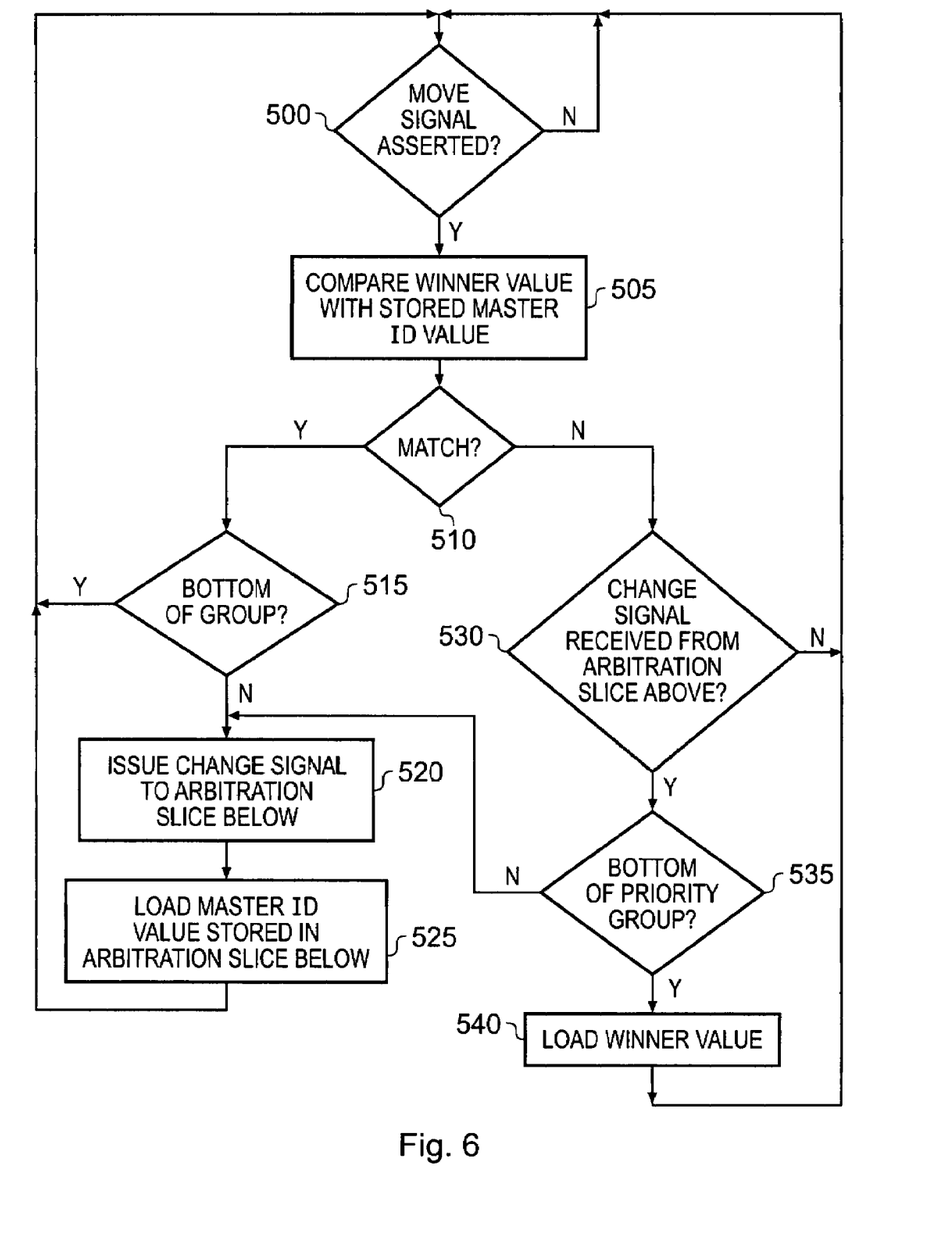
FIG. 6 is a flow diagram illustrating an update operation performed within each arbitration slice of FIG. 3 in accordance with one example embodiment.

The update operation performed within each arbitration slice can take a variety of forms. However, in one embodiment, each update operation performs the process illustrated in FIG. 6, and the update operation is performed in parallel in each arbitration slice. As shown in FIG. 6, at step 500 it is determined whether the move signal has been asserted over path 310. When the move signal is asserted, then the winner value provided as move data over path 315 is compared with the stored master ID value within the arbitration slice, whereafter at step 510 it is determined whether those values match each other. If they do, it is then determined at step 515 whether the master ID identified in the arbitration slice is at the bottom of its priority group, by determining whether a bottom of group identifier is also stored within the arbitration slice. If it is, then no further action is required, and the process returns to step 500.

However, if at step 515 it is determined that the master logic unit identified in the arbitration slice is not the bottom of the group, then at step 520 a change signal is issued to the arbitration slice immediately below the arbitration slice performing the update operation. Thereafter, at step 525, the arbitration slice loads the master ID value stored in the arbitration slice below. Accordingly, by way of example, considering stage A of FIG. 5, arbitration slice two 230 will be the arbitration logic slice that detects a match at step 510, and as it is not at the bottom of its group, it will issue a change signal to arbitration slice three 235 at step 520 and will then load from arbitration slice three at step 525 the master ID value stored therein. Thereafter, the process returns to step 500.

If at step 510, it was determined that the stored master ID value does not match the winner value broadcast over the move data line 315, then it is determined at step 530 whether a change signal has been received from the arbitration slice above. If not, no action is required, and the process returns to step 500.

However, if a change signal is received from the arbitration slice above at step 530, then at step 535 it is determined whether the master logic unit identified in the arbitration slice is at the bottom of its priority group, which will be the case if a bottom of group indication is stored in that arbitration slice. If it is determined that the arbitration slice does currently store the master ID at the bottom of the priority group, then the process proceeds to step 540, where the winner value is loaded into the arbitration slice, whereafter the process returns to step 500.

However, if it is determined at step 535 that the arbitration slice does not store the master logic unit identifier corresponding to the bottom of the priority group, then the process branches to step 520, where a change signal is issued to the arbitration slice below and then at step 525 the master ID value stored in the arbitration slice below is loaded into the current arbitration slice.

Hence by way of example, if we again consider stage A of FIG. 5, and in particular the update operation performed by arbitration slice three 235, it will not detect a match at step 510, but will receive a change signal at step 530. It will then determine that it is the bottom of the priority group, and will accordingly load the winner value at step 540, in this case loading a value identifying master logic unit two. Similarly, if we consider stage B of FIG. 5, and in particular the update operation performed by arbitration slice two 230, it will in this instance not detect a match at step 510, but will receive a change signal at step 530 from arbitration slice one 225 (which will have detected a match). At step 535, arbitration slice two will determine that it is not storing the entry at the bottom of the priority group, and accordingly will issue a change signal to arbitration slice three 235 at step 520 and will then load the current contents of arbitration slice three at step 525.

From the above description of example embodiments of the present invention, it will be seen that such embodiments provide a programmable arbitration mechanism capable of dynamically setting the arbitration policy/scheme that it implements. The policy can be updated via path 300 and control line 305 with low latency.

In accordance with the described embodiments, considering the various logic elements that share access to the shared resource, those logic elements with the same priority form a priority group. As a result of arbitration, a logic element can move within its priority group, but does not leave its group, and no new logic elements join that group. Arbitration is granted to the highest priority group from which a logic element is trying to win access to the shared resource, and within that group to the highest positioned logic element asserting a request at that time.

When a logic element wins arbitration it is relegated to the bottom of its group to ensure that it cannot prevent other logic elements in its group from accessing the shared resource.

The mechanism used in example embodiments is very flexible, as it allows multiple different arbitration schemes to be implemented. For example, if all logic elements are configured to have different priorities, then each priority group will have a single member, and the arbiter will implement a fixed priority scheme. In particular, since each logic element is in a group of its own, the priority ordering between the logic elements is maintained.

At the other end of the scale, if all logic elements are given the same priority, then a least recently granted (LRG) priority scheme can be implemented. In particular, in this example, only a single priority group will exist, and all logic elements will be in that priority group. The reason that the arbitration scheme then behaves like an LRG priority scheme is because, in accordance with the priority ordering operation employed in one embodiment, the logic element that was last granted access is relegated to the bottom of its group, this resulting in the logic elements being ordered from the least recently granted (LRG) logic element at the top, to the most recently granted (MRG) logic element at the bottom.

Furthermore, it will be appreciated that by appropriate selection of priority groups and the members of the priority groups, such LRG and fixed priority modes can concurrently exist when the configuration register is programmed with a combination of identical and unique priorities for the various logic elements. It is hence possible to mix priority groups that contain one member with priority groups that contain more than one member in an arbitrary manner. The arbiter places no restriction on the number of groups or their membership.

Although particular example embodiments have been described herein, it will be apparent that the claims are not limited thereto, and that many modifications and additions may be made within the scope of the claims.

We claim:

1. A data processing apparatus comprising:
a shared resource;
a plurality of logic elements sharing access to the shared resource;
arbitration circuitry, responsive to requests by one or more of said logic elements for access to the shared resource, to perform a priority determination operation to select one of said requests as a winning request;
the arbitration circuitry applying an arbitration policy to associate priorities with each logic element, the arbitration policy comprising multiple priority groups, each priority group having a different priority and containing at least one of said logic elements, within each priority group the arbitration circuitry applying a priority ordering operation to attribute relative priorities to the logic elements within that priority group; and
the arbitration circuitry being responsive to a predetermined event to re-apply the priority ordering operation within at least one priority group prior to a subsequent performance of the priority determination operation;
when performing the priority determination operation, the arbitration circuitry is configured to select as said winning request the one of said requests having the highest priority, where for each request, the priority of that request is determined by the priority of the priority group that contains the logic element issuing that request and the relative priorities attributed to the logic elements within that priority group.

2. A data processing apparatus as claimed in claim 1, wherein the predetermined event is a current performance of the priority determination operation, and the arbitration circuitry re-applies the priority ordering operation in respect of at least the priority group containing the logic element associated with the winning request selected by that current performance of the priority determination operation.

3. A data processing apparatus as claimed in claim 1, further comprising:
configuration circuitry for storing an indication of the priority groups and which priority group each of said logic elements is contained within.

4. A data processing apparatus as claimed in claim 3, wherein said configuration circuitry is at least partially programmable, the arbitration circuitry being responsive to reprogramming of the configuration circuitry to update the arbitration policy.

5. A data processing apparatus as claimed in claim 4, wherein the configuration circuitry is responsive to a signal specifying a new priority for one of said logic elements to re-determine the priority groups and which priority group each of said logic elements is contained within.

6. A data processing apparatus as claimed in claim 1, wherein the arbitration circuitry comprises:
a plurality of interconnected arbitration elements for collectively maintaining a priority ordered list of said logic elements for reference when performing the priority determination operation, each arbitration element for storing a logic element identifier identifying one of said logic elements, and the plurality of interconnected arbitration elements encoding which priority group each logic element is contained within;
responsive to said predetermined event, each arbitration element performing an update operation in order to determine whether to change the logic element identifier stored therein, whereby the priority ordering operation is re-applied within at least one priority group prior to a subsequent performance of the priority determination operation.

7. A data processing apparatus as claimed in claim 6, wherein said predetermined event is a current performance of the priority determination operation, and each arbitration element performs the update operation having regard to an indication of the logic element associated with the winning request.

8. A data processing apparatus as claimed in claim 6, wherein in order to encode which priority group each logic element is contained within, a bottom of group indication is stored in each arbitration element storing a logic element identifier for a logic element having the lowest relative priority in its priority group.

9. A data processing apparatus as claimed in claim 6, wherein occurrence of said predetermined event is indicated by a control signal issued to each of said arbitration elements.

10. A data processing apparatus as claimed in claim 1, wherein said priority ordering operation is re-applied within said at least one priority group following each performance of the priority determination operation.

11. A data processing apparatus as claimed in claim 10, wherein the priority ordering operation implements a least recently granted selection criteria within that at least one priority group.

12. A data processing apparatus as claimed in claim 10, wherein the priority ordering operation implements a round robin selection criteria within that at least one priority group.

13. A data processing apparatus as claimed in claim 4, wherein the configuration circuitry is programmed to identify one logic element within each priority group, whereby the arbitration policy implements a fixed priority arbitration scheme.

14. A data processing apparatus as claimed in claim 4, wherein the configuration circuitry is programmed to identify one priority group within which all of said logic elements are contained, whereby the arbitration policy implements an arbitration scheme dictated solely by the priority ordering operation.

15. A method of arbitrating access to a shared resource in a data processing apparatus having a plurality of logic elements sharing access to the shared resource, the method comprising the steps of:
   responsive to requests by one or more of said logic elements for access to the shared resource, performing within arbitration circuitry a priority determination operation to select one of said requests as a winning request;
   the arbitration circuitry:

(i) applying an arbitration policy to associate priorities with each logic element, the arbitration policy comprising multiple priority groups, each priority group having a different priority and containing at least one of said logic elements;
   (ii) within each priority group applying a priority ordering operation to attribute relative priorities to the logic elements within that priority group; and
   (iii) responsive to a predetermined event, re-applying the priority ordering operation within at least one priority group prior to a subsequent performance of the priority determination operation,
   when performing the priority determination operation, the arbitration circuitry selecting as said winning request the one of said requests having the highest priority, where for each request, the priority of that request is determined by the priority of the priority group that contains the logic element issuing that request and the relative priorities attributed to the logic elements within that priority group.

16. A data processing apparatus comprising:
   shared resource means;
   a plurality of logic element means for sharing access to the shared resource means;
   arbitration means, responsive to requests by one or more of said logic element means for access to the shared resource means, for performing a priority determination operation to select one of said requests as a winning request;
   the arbitration means for applying an arbitration policy to associate priorities with each logic element means, the arbitration policy comprising multiple priority groups, each priority group having a different priority and containing at least one of said logic element means, within each priority group the arbitration means for applying a priority ordering operation to attribute relative priorities to the logic element means within that priority group; and
   the arbitration means responsive to a predetermined event for re-applying the priority ordering operation within at least one priority group prior to a subsequent performance of the priority determination operation;
   when performing the priority determination operation, the arbitration means is configured to select as said winning request the one of said requests having the highest priority, where for each request, the priority of that request being determined by the priority of the priority group that contains the logic element means issuing that request and the relative priorities attributed to the logic element means within that priority group.

* * * * *